(12) United States Patent
Aung et al.

(10) Patent No.: US 8,783,344 B2
(45) Date of Patent: Jul. 22, 2014

(54) INTEGRAL WEAR PAD AND METHOD

(76) Inventors: Thein Htun Aung, Houston, TX (US);
Raul G. Garza, Sugar Land, TX (US);
Andrew J. Allen, Wharton, TX (US); R. Thomas Moore, College Station, TX (US)

( * ) Notice: Subject to any disclaimer, the term of this patent is extended or adjusted under 35 U.S.C. 154(b) by 0 days.

(21) Appl. No.: 13/984,569

(22) PCT Filed: Mar. 14, 2011

(86) PCT No.: PCT/US2011/028326
§ 371 (c)(1),
(2), (4) Date: Aug. 9, 2013

(87) PCT Pub. No.: WO2012/003016
PCT Pub. Date: Jan. 5, 2012

(65) Prior Publication Data
US 2013/0313025 A1  Nov. 28, 2013

(51) Int. Cl.
*E21B 17/10* (2006.01)
*B23K 20/12* (2006.01)
*B23K 31/02* (2006.01)

(52) U.S. Cl.
CPC ............. *B23K 31/02* (2013.01); *E21B 17/1085* (2013.01); *E21B 17/10* (2013.01); *B23K 20/129* (2013.01)
USPC ................... 166/241.1; 166/242.1; 175/325.1

(58) Field of Classification Search
USPC ............ 175/320, 325.1, 325.2, 325.5, 325.4;
166/241.1, 241.2, 241.4, 241.6, 241.7,
166/242.1
See application file for complete search history.

(56) References Cited

U.S. PATENT DOCUMENTS

| | | | | |
|---|---|---|---|---|
| 3,484,122 A | * | 12/1969 | Sanders et al. | 285/288.1 |
| 3,667,817 A | * | 6/1972 | Kellner | 175/325.5 |
| 3,697,141 A | | 10/1972 | Garrett | |
| 3,773,359 A | | 11/1973 | Chance et al. | |
| 3,784,238 A | | 1/1974 | Chance et al. | |
| 3,894,780 A | | 7/1975 | Broussard | |
| 3,993,368 A | | 11/1976 | Jurgens et al. | |
| 4,089,455 A | * | 5/1978 | Fellers | 228/178 |
| 4,156,374 A | * | 5/1979 | Shwayder | 76/108.2 |
| 4,296,973 A | | 10/1981 | Hartwell | |
| 4,398,772 A | | 8/1983 | Odell | |
| 4,416,476 A | | 11/1983 | Garrett | |
| 4,458,404 A | | 7/1984 | Garrett | |

(Continued)

FOREIGN PATENT DOCUMENTS

CA  2334683  7/2000
CA  2677345  9/2008

(Continued)

OTHER PUBLICATIONS

Friction Welding, Friction Welding Powerpoint Presentation (60 pages).

(Continued)

*Primary Examiner* — Jennifer H Gay
(74) *Attorney, Agent, or Firm* — McAfee & Taft

(57) ABSTRACT

The current invention provides a drill pipe of standard weight with an integral wear pad. The drill pipe with integral wear pad provides increased durability while retaining the strength, flexibility, lightweight, and other performance characteristics of standard weight drill pipe. The current invention also provides methods for making a standard weight drill pipe with integral wear pad.

81 Claims, 5 Drawing Sheets

(56) References Cited

U.S. PATENT DOCUMENTS

| | | | |
|---|---|---|---|
| 4,484,785 A | 11/1984 | Jackson | |
| 4,796,670 A | 1/1989 | Russell et al. | |
| 4,907,661 A | 3/1990 | Lloyd | |
| 5,069,297 A | 12/1991 | Krueger et al. | |
| 5,184,495 A | 2/1993 | Chunn et al. | |
| 5,261,498 A | 11/1993 | Steinkamp et al. | |
| 5,379,625 A | 1/1995 | Hale | |
| 5,437,342 A | 8/1995 | Powada | |
| 5,517,843 A | 5/1996 | Winship | |
| 5,579,854 A | 12/1996 | Barry | |
| 5,803,193 A | 9/1998 | Krueger et al. | |
| 5,833,018 A | 11/1998 | Gynz-Rekowski | |
| 5,853,199 A * | 12/1998 | Wilson | 285/45 |
| 5,901,798 A | 5/1999 | Herrera et al. | |
| RE37,167 E * | 5/2001 | Wilson | 285/45 |
| 6,250,466 B1 | 6/2001 | Ernst | |
| 6,739,415 B2 | 5/2004 | Mitchell et al. | |
| 7,409,758 B2 | 8/2008 | Le et al. | |
| 7,571,779 B2 * | 8/2009 | Hedlund et al. | 175/320 |
| 7,845,434 B2 * | 12/2010 | Clayton | 175/325.1 |
| 2002/0038727 A1 | 4/2002 | Moore et al. | |
| 2002/0117337 A1 | 8/2002 | Moore et al. | |
| 2004/0188147 A1 | 9/2004 | Mitchell et al. | |
| 2005/0028986 A1 | 2/2005 | Cannon | |
| 2006/0131881 A1 | 6/2006 | Hashem | |
| 2008/0217063 A1 | 9/2008 | Moore et al. | |
| 2009/0145597 A1 | 6/2009 | Cherewyk | |
| 2009/0266618 A1 | 10/2009 | Mitchell et al. | |
| 2010/0181767 A1 | 7/2010 | Kozal | |
| 2010/0308577 A1 * | 12/2010 | Chin | 285/333 |
| 2012/0192760 A1 * | 8/2012 | Overstreet et al. | 106/286.3 |
| 2012/0193148 A1 * | 8/2012 | Overstreet et al. | 175/320 |
| 2013/0313025 A1 * | 11/2013 | Aung et al. | 175/325.1 |

FOREIGN PATENT DOCUMENTS

| | | |
|---|---|---|
| CN | 2697302 Y | 4/2004 |
| CN | 201050313 Y | 7/2007 |
| EP | 1246996 | 10/2002 |
| GB | 2083856 A | 3/1982 |
| GB | 2320045 | 6/1998 |
| WO | WO96/03568 | 2/1996 |
| WO | WO97/13951 | 4/1997 |
| WO | WO98/28516 | 7/1998 |
| WO | WO99/57478 | 11/1999 |
| WO | WO 2009/132301 | 10/2009 |

OTHER PUBLICATIONS

Operational STeps in Friction Welding and Inertia Welding, http://www.welding-technology-machines.info (1 page).

Chance Door International Co., Ltd., Offer Details, Heavy Weight Drill Pipe.

* cited by examiner

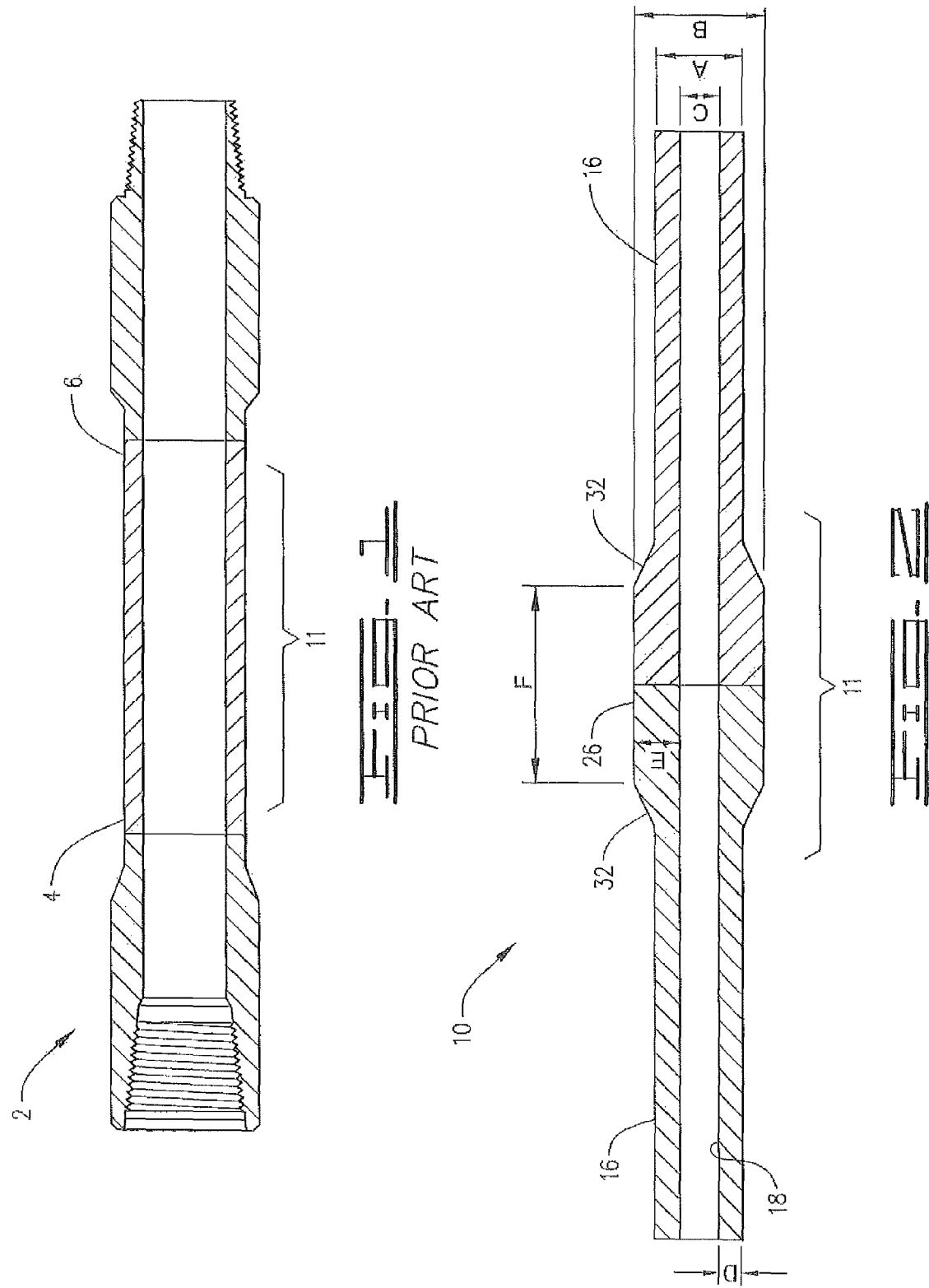

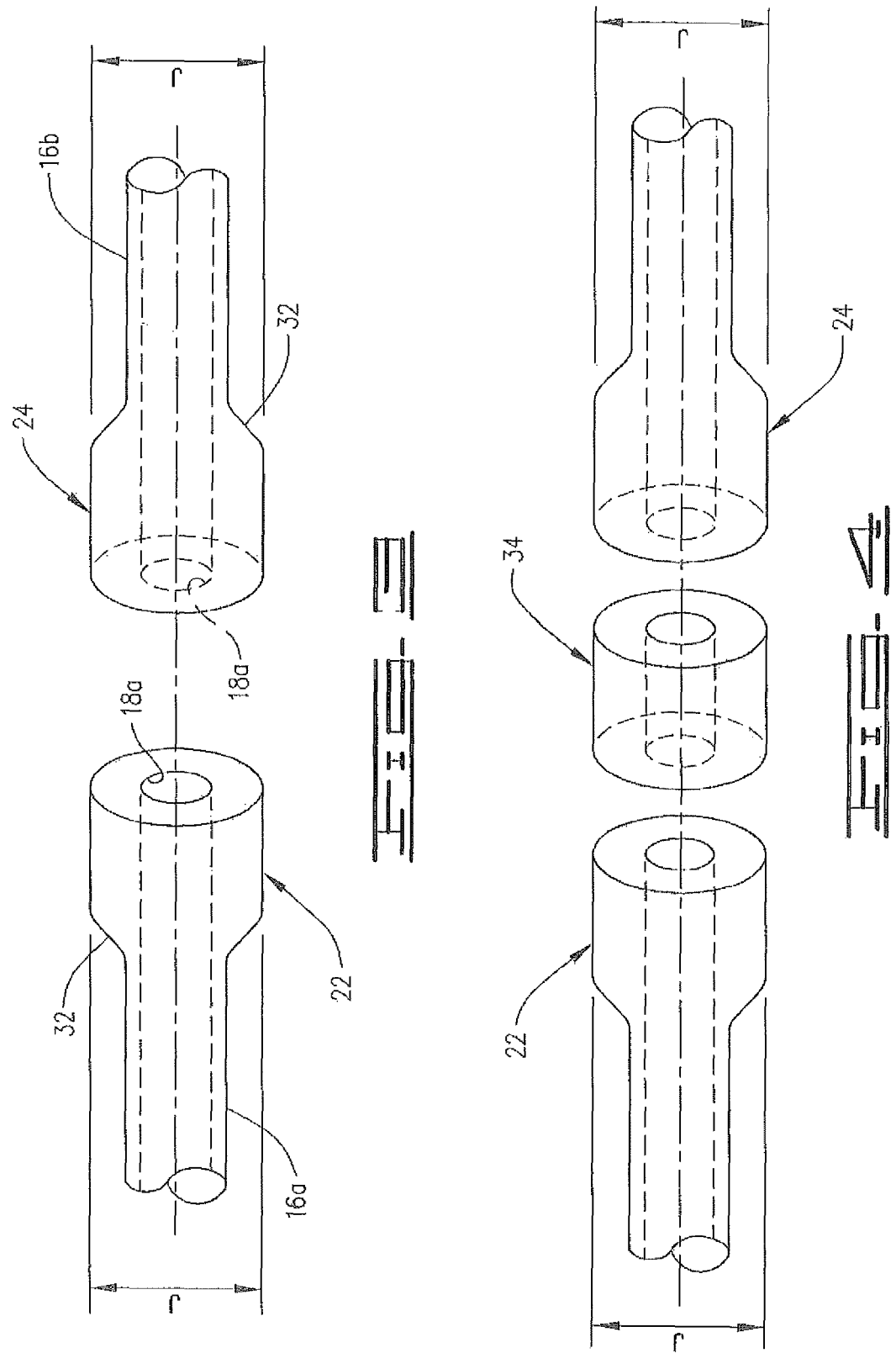

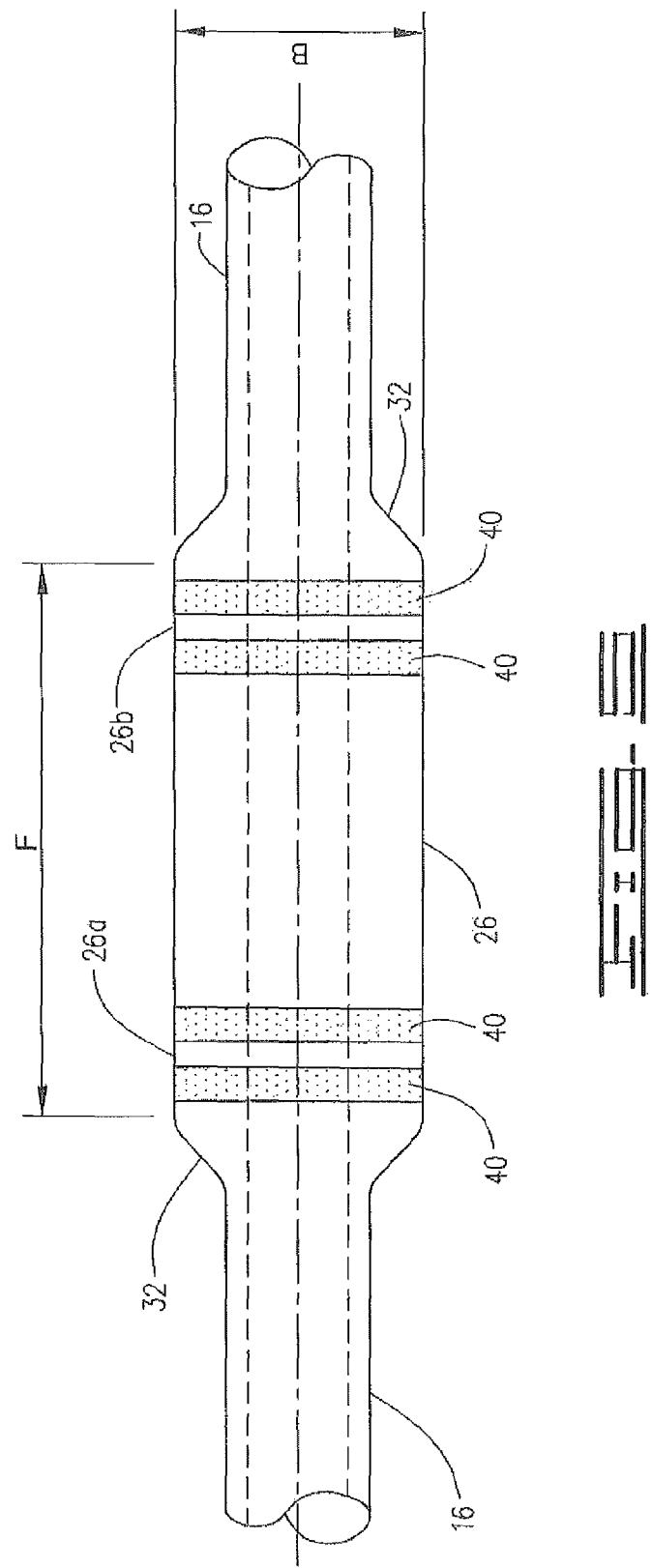

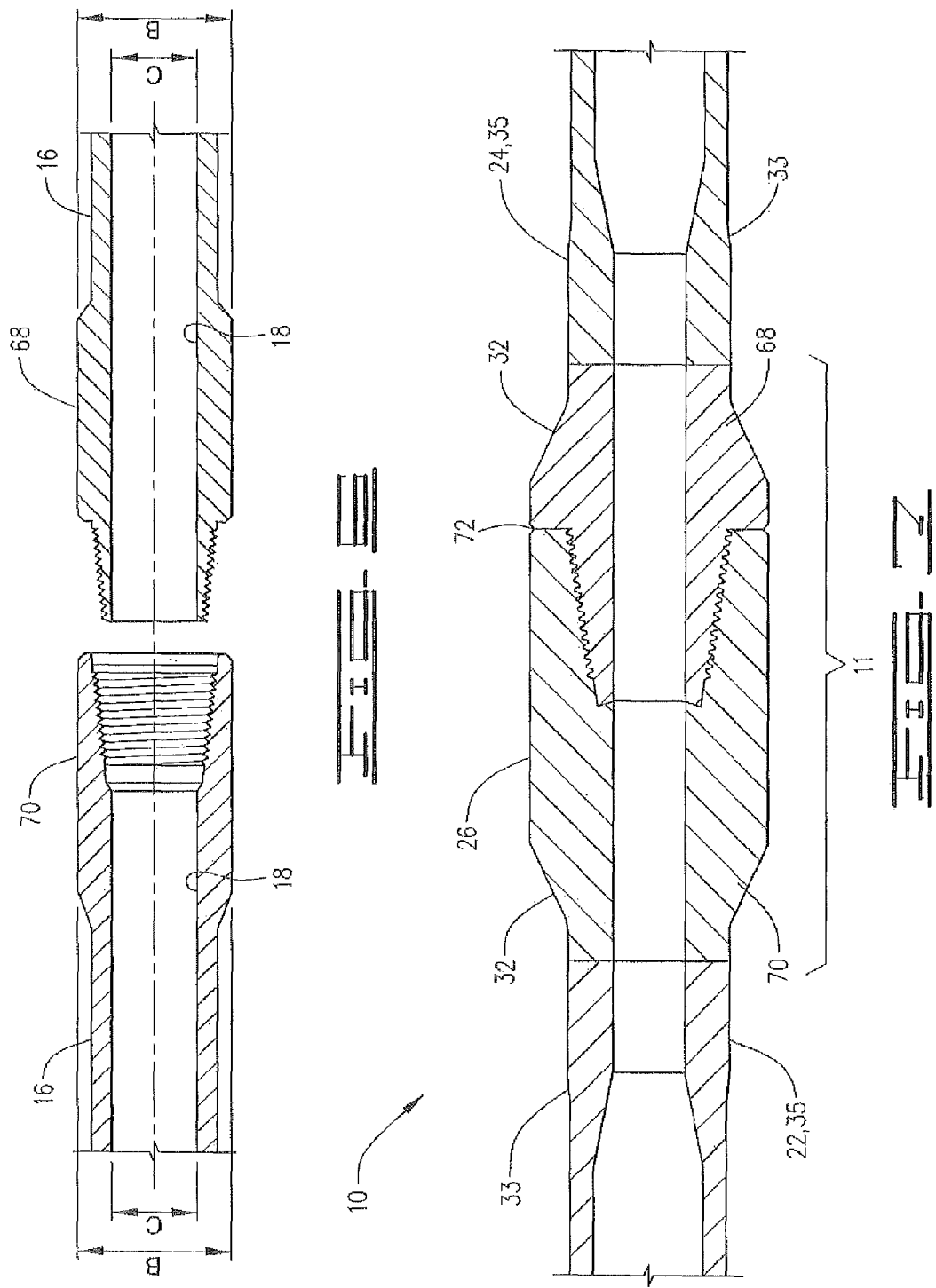

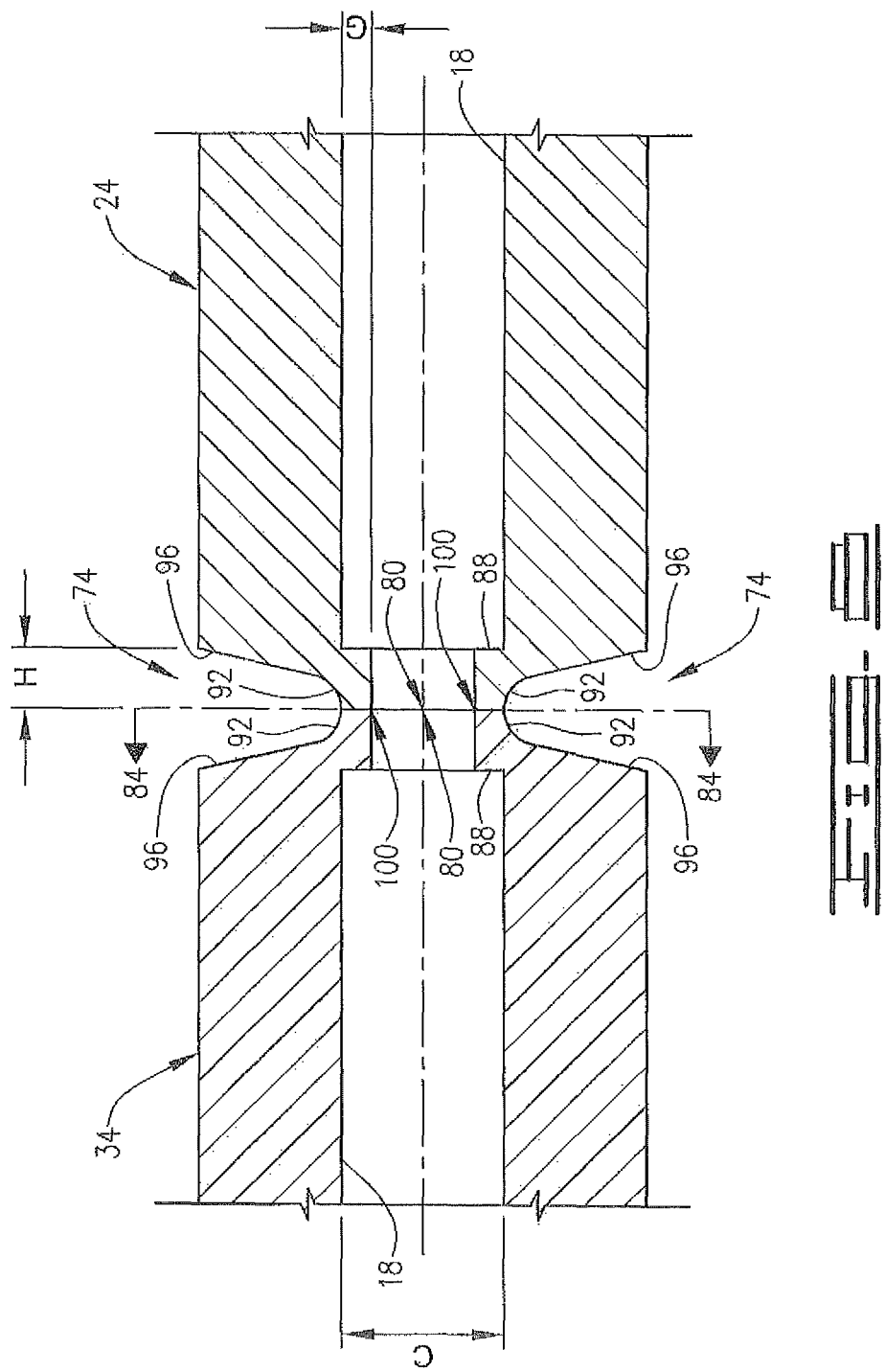

INTEGRAL WEAR PAD AND METHOD

The present application is a national phase entry of PCT Application No. PCT/US11/028326 entitled INTEGRAL WEAR PAD AND METHOD filed Mar. 14, 2011.

BACKGROUND OF THE INVENTION

Drilling operations subject drill pipe to a variety of stresses, frictional forces, and environments. During directional drilling, the drill pipe will bend, resulting in well bore contact. As a result, the center portion of the drill pipe will wear and ultimately lead to failure or premature replacement of the drill pipe. The terms drill pipe and standard weight drill pipe are referred to interchangeably herein.

To alleviate some of the damage produced during directional drilling, wear pads may be installed at select locations on the drill pipe. Wear pads presently used with standard weight drill pipe are generally cylindrical, sleeve-like devices installed on the exterior surface of the drill pipe. Many of these sleeve-like wear pads clamp to the exterior surface of the drill pipe. Unfortunately, clamp style wear pads tend to slip leaving target wear prone areas exposed. Additionally, the necessary installation and subsequent maintenance of clamp style wear pads will slow down drilling operations.

Standard weight drill pipe has mechanical properties such as flexibility, toughness, and fatigue resistance, among others that make it particularly suitable for use in the center of a drill string. A particular drill string may include a variety of components, such as drill collars and intermediate weight members, which are typically used between the drill bit and the drill pipe in the drill string. These components are made of thicker, stiffer, heavier materials than standard weight drill pipe. Accordingly, drill collars and intermediate weight members are used as a transition from drill bit to drill pipe in order to reduce impact loads on the drill pipe. Since at least 1960, drill collars and intermediate weight members have been available with machined wear pads. However, drill collars and intermediate weight members do not have the stated mechanical properties of drill pipe. Additionally, these heavier components use a greater amount of limited drill rig power and lack flexibility. Other limitations prevent drill collars and intermediate weight members from functioning as a feasible alternative to drill pipe and the wear pads mentioned above.

Although currently available wear pads for standard weight drill pipe provide some protection and functionality, improvements are desired by the industry. The industry desires increased performance and reduced maintenance at the well site in order to enhance safety and minimize operational costs.

BRIEF SUMMARY OF THE INVENTION

The present invention provides an improved standard weight drill pipe. The improved drill pipe includes an integral wear pad suitable for shielding the drill pipe from erosion during directional drilling processes. Typically, the integral wear pad is centrally located on the drill pipe; however, the position of the integral wear pad may vary. Further, the improved drill pipe may have one or more integral wear pads.

Further, the present invention provides methods for manufacturing standard weight drill pipe having an integral wear pad. According to one embodiment, a first upset is formed on the first end of a first length of standard weight drill pipe. A second upset is formed on the first end of a second length of standard weight drill pipe. The first and second lengths of drill pipe are joined by integrally bonding the first and second upsets to one another thereby yielding a single drill pipe having an integral wear pad corresponding to the first and second upsets.

In an alternative embodiment, the method of the present invention forms first and second upset ends on separate drill pipe stock. The method also provides a section of drill pipe having an outer diameter and cross-sectional thickness corresponding to the first and second upsets. According to this embodiment, the short section of drill pipe is bonded between the first and second upsets to produce a single length of drill pipe having an integral wear pad corresponding to the first and second upsets and the short section of drill pipe.

Still further, in an alternative embodiment, the method of the present invention forms first and second upsets on separate drill pipe stock. The respective upsets are suitably formed for connection to a conventional tool joint pin and box. A conventional tool joint pin is secured to one drill pipe while a box is secured to the other drill pipe. Thereafter, the tool joint pin and box are threadedly secured together. Subsequently, the joints formed by the tool joint pin and box are welded to provide a drill pipe having an integral wear pad. Optionally, hard banding material may be applied to the wear pad.

In another alternative embodiment, the present invention provides a method for forming wear resistant drill pipe. In this method, the present invention initially forms first and second upsets on separate drill pipe stock. The method also provides a short section of pipe with a wear pad formed between each end of the short section, wherein the wear pad has a larger outer diameter than the first and second upsets and the separate drill pipes. Further, the method provides the short section of pipe with each end having an outer diameter and cross-sectional thickness corresponding to the first and second upsets. According to this embodiment, the short section of pipe is bonded between the first and second upsets to produce a single length of drill pipe having an integral wear pad formed into the short section of pipe.

In yet another embodiment, the present invention provides a method of manufacturing wear resistant drill pipe for use in the down-hole environment. This method provides two stock components of standard weight drill pipe with each drill pipe having a first external diameter. The methods form a first upset on at least one end of the first standard weight drill pipe and a second upset on at least one end of the second standard weight drill pipe. The upsets have a second external diameter. The external diameter of the second upset is substantially the same as the second external diameter of the first upset. The method also provides a third tubular member comprising a wear pad having a third external diameter, a first end having a fourth external diameter, and a second end having an fourth external diameter, wherein the fourth external diameters of the first and second ends of the third tubular member are substantially equal to one another and substantially equal to the second external diameters of the first and second upsets. The third external diameter of the wear pad is greater than the first external diameters of the first and second standard weight drill pipes ends and the second external diameters of the first and second upsets. The wear pad is located between the first and second ends of the third tubular member. According to this method of the current invention, the first upset is joined to the first end of the third tubular member. The method of joining maintains the first standard weight drill pipe substantially concentric with the third tubular member. Subsequently, the method joins the second upset to the second end of the third tubular member. The method of joining maintains the second standard weight drill pipe substantially concentric with the third tubular member and the first standard weight drill pipe.

BRIEF DESCRIPTION OF THE DRAWINGS

FIG. 1 depicts a prior art drill pipe.

FIG. 2 depicts an improved drill pipe with an integral wear pad.

FIG. 3 depicts individual drill pipes with opposing upsets aligned prior to forming a drill pipe with an integral wear pad.

FIG. 4 depicts an alternative embodiment with a central piece of drill pipe positioned between two opposing upsets prior to forming a drill pipe with an integral wear pad.

FIG. 5 depicts an enlarged view of the central wear pad.

FIG. 6 depicts an alternative embodiment wherein a tool joint pin has been secured to one upset and a tool joint box secured to another upset. When secured together, the tool joint pin and box form the integral wear pad.

FIG. 7 is a cross-sectional view of the embodiment of FIG. 6 following the connection of the tool joint pin and box to provide a drill pipe with an integral wear pad.

FIG. 8 is a cross-sectional view of a weld groove formed to facilitate welding of an upset carried by a drill pipe to a third tubular member.

DETAILED DISCLOSURE

Standard Weight Drill Pipe with Integral Wear Pad

As used herein, the term "standard weight drill pipe" refers to drill pipe manufactured to American Petroleum Institute (API) Specification 5DP. Standard weight drill pipe satisfying this standard may comprise a variety of metals. A typical standard weight drill pipe will be manufactured from American Iron and Steel Institute (AISI) 4127-4130 grade steel. Drill pipe satisfying API Specification 5DP may have a range of wall thicknesses. Typically, the maximum wall thickness (D) of standard weight drill pipe satisfying API Specification 5DP will be less than approximately 1.000 inches but greater than 0.250 inches. As such, standard weight drill pipe differs significantly from intermediate and heavy weight drill pipes, and drill collars, which typically have wall thicknesses of 1.000 inch or greater.

With reference to FIG. 1, a standard prior art drill pipe 2, includes first and second ends 4, 6 suitable for securing tools or one drill pipe 2 to another. As known to those skilled in the art, standard weight drill pipe will flex during directional drilling operations. During such operations, central region 11 will commonly contact the well bore wall or the casing. As a result, central region 11 will experience excessive wear.

With continued reference to the drawings, the current invention provides an improved standard weight drill pipe 10 having an integral wear pad 26. Drill pipe 10 includes a drill pipe body 16 having an internal bore 18 extending the length thereof. Internal bore 18 also passes through the region defined by wear pad 26. Drill pipe 10 is suitable for standard or conventional use within the downhole drilling environment. As such, drill pipe 10 may be modified at either end for inclusion within a pipe string or for attachment of various tools or tool joints. Such modifications are well known in the art and will not be discussed herein. Rather, the following discussion will focus on the improvement provided by integral wear pad 26 and methods for producing a standard weight drill pipe having an integral wear pad.

As noted above, standard weight drill pipe will bend during drilling, particularly during directional drilling processes. Therefore, the central region 11 of drill pipe 10 most commonly contacts the wellbore well and experiences the greatest degree of wear during drilling operations. To extend drill pipe life, the present invention provides an integral wear pad 26. Preferably, at least one wear pad 26 will be located within central region 11 of drill pipe 10. One centrally located wear pad 26 will protect drill pipe 10 from excessive wear during drilling. Depending on the formation, borehole, and other drilling conditions, the present disclosure also contemplates a drill pipe 10 having a plurality of integral wear pads 26.

With reference to FIGS. 2, 5 and 7, the preferred embodiment of wear pad 26 includes at least a pair of first tapers 32. As shown in FIGS. 2 and 5, tapers 32 provide a transition from external diameter (A) of drill pipe body 16 to external diameter (B) of wear pad 26. The optional first transitional tapers 32 reduce snags during drilling. The external diameter (B) of wear pad 26 is at least 0.500 inches greater than the diameter (A) of drill pipe body 16. In this configuration, wear pad 26 will shield the thinner walled drill pipe body 16 from damage occurring from borehole contact. Thus, in the preferred embodiment, the additional diameter thickness provided by external diameter (B) will preclude contact of drill pipe body 16 with a borehole wall during drilling.

Diameter (A) of drill pipe body 16 will be within the range specified by API Specification 5DP. Typically, diameter (A) will be between 3.500 and 6.625 inches and will be generally consistent along drill pipe body 16 unless modified to accept a tool joint or other similar connection as known to those skilled in the art.

In the preferred embodiment, wear pad 26 further includes a surface layer 40 providing increased wear resistance. Layer 40 is preferably a sacrificial material commonly adhered to the circumferential surface of tool joints. As such, the types of sacrificial materials and methods for applying the same are well known to those skilled in the art. The preferred sacrificial material will not damage the casing in the well bore. Layer 40 is commonly known in the industry as a hardbanding layer 40. As shown in FIG. 5, layer 40 does not necessarily cover the entirety of wear pad 26.

Commonly known as a hardbanding layer or wear surfacing layer to those skilled in the art, inclusion of hardbanding layer 40 on the circumferential surface of wear pad 26 will further enhance the life of drill pipe 10. Materials suitable for use as a hardbanding layer 40 include but are not necessarily limited to heat treatable tool steel wire such as DURA-BAND™ or TUFFBAND™, available from Postle Industries, Inc., P.O. Box 42037, Cleveland, Ohio, United States. In the preferred embodiment, hardbanding layer 40 will be hardened steel having a hardness rating greater than that of drill pipe 10. As such, hardbanding layer 40 will preferably have a Rockwell C-scale (HRC) hardness rating of about 45 HRC to about 55 HRC.

Preferably, hardbanding layer 40 will be about 0.125 inches to about 0.188 inches in thickness. The inclusion of hardbanding layer 40 on the circumferential surface of wear pad 26 increases the overall external diameter (B) by twice the thickness of the layer 40. In general, total wear pad 26 external diameter (B) may range from about 4.250 inches to about 8.375 inches, including hardbanding layer 40. The cross-sectional thickness of wear pad 26, including hardbanding layer 40, may range from about 1.125 inches to about 1.688 inches. If hardbanding layer 40 is omitted, then overall external diameter (B) may range from about 4.000 inches to about 8.000 inches. The wear pad cross-sectional thickness (E) without hardbanding layer 40 may range from about 1.000 inch to about 1.500 inches.

Integral wear pad 26 preferably comprises a redistributed portion of the substrate material of the standard weight drill pipe body 16. In this manner, drill pipe 10 with integral wear pad 26 exhibits a refined metallurgical grain structure thereby providing wear pad 26 with mechanical properties at least corresponding to a conventional drill pipe lacking integral wear pad 26. Preferably, the metallurgical grain structure of drill pipe 10 throughout the transition from the external diameter (A) of drill pipe body 16 to the external diameter (B) of wear pad 26 remains oriented parallel with the profile of the transition. Thus, the metallurgical nature of wear pad 26 corresponds, for example, to the strength, toughness, flexibility, and fatigue resistance of drill pipe body 16. Inclusion of hardbanding layer 40 on wear pad 26 will not degrade the mechanical properties of drill pipe 10. Thus, the current invention reduces down time at the well bore site without sacrificing operability.

With reference to FIGS. 2, 5 and 7, the improved drill pipe 10 includes the previously discussed first transitional tapers 32, wear pad 26, hardbanding layer 40, and drill pipe body 16. In the preferred embodiment, centrally located wear pad 26 will have an overall length (F) of about 2.000 inches to about 24.000 inches extending between first taper regions 32, i.e. the length (F) of wear pad 26 does not include first taper regions 32. The preferred length (F) of wear pad 26 will range from about 10.000 inches to about 14.000 inches. With reference to the axis running the length of drill pipe 10, each first taper 32 will generally have an axial length ranging from about 0.500 to about 6.000 inches. Preferably, the axial length of first tapers 32 will range from about 2.000 to about 4.000 inches and have an angular slope of about 15 degrees to about 25 degrees. Further, the angular slope of each first taper 32 will preferably have a metallurgical grain structure generally oriented parallel to the angular slope. Internal bore 18 passing through drill pipe body 16 also passes through wear pad 26. In the preferred embodiment, bore 18 has a substantially consistent internal diameter (C) for the entire length of drill pipe 10. Any slight restrictions within the region of wear pad 26 will not degrade performance of drill pipe 10.

With reference to FIG. 7, one preferred embodiment of the improved drill pipe 10 includes second transitional tapers 33 and shoulders 35 in addition to the previously discussed first transitional tapers 32, wear pad 26, hardbanding layer 40, and drill pipe body 16. Second transitional tapers 33 have an axial length ranging from about 0.500 inches to about 6.000 inches and an angular slope of about 15 degrees to about 25 degrees. Shoulders 35 have an axial length ranging from about 0.500 inches to about 2.000 inches. Thus, the present invention contemplates drill pipe 10 with a transitional portion, without limitation to a particular shape, from the external diameter (A) of drill pipe body 16 to the external diameter (B) of wear pad 26. In this particular embodiment, the metallurgical grain structure of drill pipe 10 will preferably remain oriented parallel to the angular slope of second tapers 33 and profile of shoulders 35. As previously discussed, the metallurgical grain structure of first tapers 32 will preferably remain oriented parallel to the angular slope of first tapers 32. Internal bore 18 passing through drill pipe body 16 also passes through second tapers 33, shoulders 35, first tapers 32, and wear pad 26. In the preferred embodiment, bore 18 has a substantially consistent internal diameter (C) for the entire length of drill pipe 10. Any slight restrictions within the region of wear pad 26 will not degrade performance of drill pipe 10.

With reference to the above description and the drawings, wear pad 26 may correspond to modified ends of drill pipe body 16 subsequently joined in a manner discussed below to produce the improved drill pipe 10 of the present invention. Alternatively, wear pad 26 may correspond to an additional section of tubular pipe 34. Tubular pipe 34, also referred to as tubular member 34, will have metallurgical characteristics corresponding to that of drill pipe body 16. Thus, when secured between two drill pipe bodies 16, tubular section 34 provides an integral wear pad 26 as discussed herein. Regardless of the basis for integral wear pad 26, the resulting improved drill pipe 10 has an integral wear pad 26 and has metallurgical and mechanical characteristics corresponding to standard weight drill pipe.

Thus, the present invention provides improved standard weight drill pipe 10 including at least one wear pad 26. Preferably wear pad 26 is centrally located on drill pipe 10. Further, by using conventional methods one skilled the art can readily attach tools or incorporate drill pipe 10 into a drill string for use in downhole operations.

Methods for Manufacturing Standard Weight Drill Pipe with Integral Wear Pad

With continued reference to the drawings, the present invention also provides manufacturing processes for preparing a standard weight drill pipe 10 having an integral wear pad 26.

In one preferred embodiment, the method of the current invention forms drill pipe 10 with integral wear pad 26 by concentrically joining two upsets 22, 24 together. In another preferred embodiment, the method of the present invention provides a drill pipe having an integral wear pad by concentrically incorporating a third tubular member 34 between upsets 22, 24. Third tubular member 34 may be, for example, a short section of drill pipe stock or a tube formed from a tool joint pin and box threadedly connected to one another. In yet another preferred embodiment, third tubular member 34 may be a short section of tube having a wear pad forged or machined onto the exterior surface of the tube.

In one preferred method, the current invention utilizes a forging process known as upsetting. Commonly practiced to form a mounting point for tools or joints on the ends of drill pipe, this hot forging process increases the wall thickness and refines the grain structure of the substrate material at the end of the drill pipe 10 in the location of the upset. Methods for generating upsets on the ends of drill pipe are well known to those skilled in the art and will not be further discussed herein. For one example of an upsetting process, see U.S. Pat. No. 4,192,167, the disclosure of which is incorporated herein by reference.

In one preferred embodiment, the method of the present invention includes the steps of providing a first upset 22 on an end of a first drill pipe body 16*a*. The method also provides a second upset end 24 on a second drill pipe body 16*b*. As known to those skilled in the art, an upsetting process increases the wall thickness of the end of a drill pipe by compressing the drill pipe lengthwise, thereby redistributing the substrate material of the drill pipe in the area of the upset at the end of the pipe. The resulting upsets 22, 24 have an internal bore 18*a* substantially consistent with the original bore 18 of drill pipe body 16. Thus, the internal diameters (C) of bore 18 and bore 18*a* are substantially the same. However, the external diameter (J) of each upset 22, 24 exceeds the diameter (A) of the drill pipe body 16.

Following formation of upsets 22 and 24, the method concentrically joins upsets 22 and 24 by welding the respective upsets to one another. The resulting drill pipe 10 exhibits consistent mechanical properties throughout wear pad 26 and drill pipe 10. The method of the present invention contemplates welding techniques such as, without limitation, friction welding, inertia welding, flash welding, stub welding, and submerged arc welding.

The preferred embodiment uses an inertia welding process to produce drill pipe 10 with an integral wear pad 26. Inertia welding is well known to those skilled in the art as a technique suitable for securing tool joints and other similar components to upsets carried by drill pipe. Thus, the devices and techniques for inertia welding are well known to those skilled in the art.

With reference to FIG. 4, an alternative embodiment also uses a conventional inertia welding process to concentrically join a first end of a third tubular member 34 to either upset 22 or upset 24. In this particular embodiment, third tubular member 34 may be a short section of drill pipe stock having an external diameter (B) substantially consistent with the external diameter (J) of upsets 22, 24. Third tubular member 34 may also be a short section of tube with a wear pad having an external diameter (B) forged or machined onto the exterior surface of the tube between the ends. In either configuration, each end of third tubular member 34 has a cross-sectional thickness and exterior diameter substantially consistent with the respective cross-sectional thickness and exterior diameter of upsets 22, 24.

The method for incorporating third tubular member 34 into the improved drill pipe 10 may utilize an inertia welding step to secure tubular member 34 to both upsets 22 and 24. Alternatively, the method uses inertia welding to secure the first end of tubular member 34 to one upset 22 or 24 and submerged arc welding to secure the second end of tubular member 34 to the remaining upset 22 or 24. However, any welding process capable of providing the desired bond between components while providing the desired metallurgical characteristics will be acceptable for both welding steps.

The use of a submerged arc welding method for securing tubular member 34 to one of the upsets 22 or 24 preferably includes the step of forming a weld groove 74 between the second end of the tubular member 34 and the unsecured upset 22 or 24 prior to welding. Use of weld groove 74 will improve bond integrity between the welded components.

Providing the weld groove 74 requires forming a step 88 on both the unsecured upset 22 or 24 and the second end of tubular member 34. Preferably, step 88 is formed using separate reaming processes that extend lengthwise throughout the bore 18 of drill pipe stock 16 and tubular member 34. These reaming steps may occur at anytime before or during the manufacture of improved drill pipe 10. The reaming process stops short a length (H) from inlet 80 within drill pipe stock 16 corresponding to the end defined by the unsecured upset 22 or 24. Within the tubular member 34, the reaming process stops short a length (H) from the inlet 80 within the second end of tubular member 34. Thus, length (H) defines the axial length of each step 88. When mated to one another, steps 88 provide a landing 100 which acts as the floor of weld groove 74 and precludes the over penetration of weld into bore 18.

To provide the walls of weld groove 74, a radius 92 is machined into the faces 84 of the second end of tubular member 34 and the unsecured upset 22 or 24. Subsequently, the faces 84 of the second end of tubular member 34 and the unsecured upset 22 or 24 machined to provide bevels 96 intersecting each radius 92 at an angle between about 15 degrees to about 20 degrees from each face 84. Subsequently abutting together the tubular member 34 concentric with the unsecured upset 22 or 24 provides a weld groove 74 with a landing 100. Steps 88, each radius 92, and each bevel 96 define weld groove 74.

Each face 84 is defined by a cross-section taken perpendicular to the axis of each bore 18. Each step 88 has a height (G) extending inwardly from the inner surface of each bore 18, and a length (H) extending from each inlet 80 into each bore 18. The height (G) of step 88 is between about 0.0625 inches to about 0.1875 inches and the length (H) is between about 0.1875 inches to about 0.3125 inches. For a length (H) at each inlet 80, the height (G) of step 88 provides an internal diameter between about 0.125 inches to about 0.375 inches less than the finished internal diameter (C) of bore 18. Preferably, step 88 is machined by reaming out each bore 18 to internal diameter (C) beginning at an end of bore 18 opposite inlet 80 and stopping a distance equal to length (H) from each inlet 80. Machining step 88 in this fashion requires bore 18 to have an unfinished internal diameter smaller than the finished internal diameter (C) by at least two times height (G). In this manner, reaming bore 18 out as stated above will leave step 88 having height (G) and length (H) around the inner circumference of bore 18.

Accordingly, weld groove 74 facilitates the application of a uniform weld throughout the cross-sectional thickness of each face 84. After welding the second end of third tubular member 34 to the unsecured upset 22 or 24, landing 100 is preferably removed by finish reaming bore 18 to internal diameter (C). Preferably, the method also preheats the third tubular member 34 and unsecured upset 22 or 24 to a temperature between about 350 degrees Fahrenheit to about 450 degrees Fahrenheit prior to application of the weld to the weld groove 74. Furthermore, during the application of the weld, the method applies a mist to each bore 18.

In the embodiment utilizing the inertia welding process, first drill pipe body 16a is secured in a jig which precludes rotational movement thereof while second drill pipe body 16b is mounted to a mandrel or other suitable support within the inertia welding device. Drill pipe bodies 16a, 16b are mounted such that upsets 22 and 24 are opposing and concentric with one another. Prior to carrying out the welding step, upsets 22 and 24 are preferably brought together to ensure direct alignment thereof and any necessary adjustments to achieve direct alignment carried out. Subsequently, the inertia welding machine rotates one drill pipe body 16 and moves upset 24 into direct contact with upset 22. The rotational rate and pressure applied by the inertia welding machine will generate sufficient heat to weld upset 22 to upset 24. The resulting weld is a homogeneous, solid state weld having consistent characteristics from the internal bore 18a to the external surface of the resulting wear pad 26. Thus, the mating and welding of upsets 22, 24 to one another produces an integral wear pad 26 in the resulting drill pipe 10. The resulting wear pad 26 has dimensions corresponding generally to the original upsets 22 and 24.

Suitable inertia welders for practicing this embodiment include, but are not limited to, inertia welder model numbers 300BX and 400BX sold by Manufacturing Technology, Inc., 1702 West Washington, South Bend, Ind. 46628, United States.

Force constants, rotational rates, and weld pressures may vary with different models of inertia welders and with different inertia welders of the same model. For example, the force constant, or $WK^2$, for producing the inertia weld may range from about 45,560 on 31 square inches of weld to about 8,560 on 6 square inches of weld. The rotational rate of drill pipe body 16 may range from about 757 revolutions per minute for 31 square inches of weld to about 778 revolutions per minute for 6 square inches of weld. The inertia welder may have weld pressure on upset 24 carried by drill pipe body 16b against upset 22 carried by drill pipe body 16a of about 196 pounds per square inch for 6 square inches of weld to about 987 pounds per square inch for 31 square inches of weld. More preferably, the pressure of the inertia welding process will forge from about 686 pounds per square inch for 6 square inches of weld to about 3,456 pounds per square inch for 31 square inches of weld.

Following formation of drill pipe 10 with integral wear pad 26, bore 18a is optionally reamed out to ensure a substantially consistent internal bore 18 passing through drill pipe 10. The step of reaming out the area corresponding to the welded upsets 22, 24 removes any excess slag produced by the welding step. Additionally, the external diameter of wear pad 26 may optionally be machined to provide a smooth, generally consistent external diameter (B).

Following welding and subsequent machining steps, internally and externally, the method of the present invention further heat treats the resulting drill pipe 10. The heat treating steps encompass the entire length of drill pipe 10 and eliminate any heat affected zones formed during the welding operations. The heat treating steps produce a hardness generally corresponding to the hardness of a tool joint, i.e. a hardness ranging from about 20 HRC to about 38 HRC. The preferred heat treating process includes the following steps: (a) austenitizing at a temperature of about 1650 degrees Fahrenheit; (b) water quenching to ambient temperature, or about 72 degrees Fahrenheit; and, (c) tempering at a temperature ranging from about 1050 to 1200 degrees Fahrenheit.

Following the heat treating step, drill pipe 10, now with integral wear pad 26, is ready for further modification as required for use in the downhole environment. Prior to heat treatment, the preferred embodiment places a conventional upset (not shown) for the connection of tool joints (not shown) on each end of drill pipe 10 and adds the optional hardbanding layer 40 to wear pad 26.

In one preferred embodiment, hardbanding is applied to upsets 22 and 24 after the step of joining the upsets to one another. In yet another preferred embodiment, hardbanding layer 40 is applied to tubular member 34 prior to welding member 34 between upsets 22 and 24. In general, the step of adding the hardbanding material may occur at any convenient time during the manufacturing process. Additionally, the life of drill pipe 10 may be extended by applying or re-applying hardbanding in the field.

The methods for adding a hardbanding layer are well known to those skilled in the art. In general, this step requires the welding of hardened circumferential tool steel wire bands to the outer circumferential surface of wear pad 26. Typically, a welding process such as Metal Inert Gas (MIG) welding will be used to secure the hardbanding material to wear pad 26. In the preferred embodiment, first outer end 26a and second outer end 26b of wear pad 26 will each receive hardbanding.

In yet another embodiment, the method of the present invention includes steps for producing drill pipe 10 with integral wear pad 26 formed from a tool joint pin and box. This embodiment includes the step of forming a first upset 22 on a first drill pipe body 16a. This embodiment also forms a second upset 24 on a second drill pipe body 16b. In this particular embodiment, upsets 22 and 24 are suitably formed for connection to a conventional tool joint pin 68 and box 70.

After the formation of upsets 22 and 24, this embodiment applies the previously discussed heat treating steps to drill pipe bodies 16a, 16b, and a conventional tool joint pin 68 and tool joint box 70. Preferably, the tool joint pin 68 and box 70 have between about 0.250 to 2.000 inches of taper per foot thread connection with a reversed angle torque shoulder on the tip of the tool joint pin 68 as shown in FIG. 7. The tool joint pin 68 and box 70 of this embodiment have an external diameter (B) substantially equal to one another and at least 0.500 inches greater than the external diameters (A) of drill pipe body 16a and 16b. Subsequent to heat treatment, this preferred embodiment further includes the step of concentrically welding upset 22 to the tool joint box 70 and upset 24 to the tool joint pin 68. The step of welding upsets 22, 24 to the tool joints 70, 68 preferably uses an inertia welding process.

With reference to FIG. 7, after welding the tool joints 70, 68 to the upsets 22, 24, this preferred embodiment further includes the steps of threadedly connecting the tool joint pin 68 to box 70, and permanently securing the connection between pin 68 and box 70. Preferably, the mating of pin 68 and box 70 leaves a weld groove 72 around the exterior circumference thereof. Groove 72 permits the application of a weld thereby permanently securing pin 68 to box 70. Preferably, the groove 72 has a depth ranging from about 0.500 inches to about 1.000 inches and a width ranging from about 0.375 inch to about 1.000 inches. Any known method for forming groove 72 will suffice for this particular embodiment. The method of the present invention also contemplates the use of known techniques such as cross drilling and application of thread-locking agents for permanently securing the connection of pin 68 to box 70.

The preferred embodiment for permanently securing pin 68 to box 70 with a weld further comprises the following steps: (a) preheating pin 68 and box 70 to a temperature between about 350 degrees Fahrenheit to about 450 degrees Fahrenheit prior to application of the weld to the weld groove 72; and (b) applying a water mist to the bores 18 of pin 68 and box 70 during application of the weld.

Subsequent to welding the connection of pin 68 and box 70, this preferred embodiment includes the step of stress relieving the welded area with a localized heat treatment. Stress relieving includes the following steps: (a) raising the welded joints to a temperature between about 1250 degrees Fahrenheit to about 1300 degrees Fahrenheit, preferably to about 1275 degrees Fahrenheit, for between about 10 minutes to about 30 minutes; and (b) cool in still air. The completion of the stress relieving step provides a drill pipe 10 with integral wear pad 26 formed from the connection of tool joint pin 68 and box 70.

Following the stress relieving step, a hardbanding layer 40 may be applied to wear pad 26. Preferably, first outer end 26a and second outer end 26b of wear pad 26 will each receive two hardbanding layers 40.

Other embodiments of the current invention will be apparent to those skilled in the art from consideration of this specification or practice of the invention disclosed herein. Thus, the foregoing specification is considered merely exemplary of the current invention with the true scope and spirit of the invention being defined by the following claims.

What is claimed is:

1. A wear resistant drill pipe for use in the down-hole environment comprising:
a standard weight drill pipe body having at least one integral wear pad, wherein the wear pad comprises a redistributed portion of a substrate material of the standard weight drill pipe body.

2. The wear resistant drill pipe of claim 1, further comprising a hard-banding layer on the wear pad.

3. The wear resistant drill pipe of claim 1, wherein the wear pad has an external diameter of at least 0.5 inches greater than an external diameter of the standard weight drill pipe body.

4. The wear resistant drill pipe of claim 1, wherein the wear pad has a length between about 2 inches to about 24 inches.

5. The wear resistant drill pipe of claim 1 wherein the wear pad has a length between about 10 inches to about 14 inches.

6. The wear resistant drill pipe of claim 1, wherein the wear pad has an external diameter between about 4 inches to about 8 inches.

7. The wear resistant drill pipe of claim 1, wherein the wear pad has a cross-sectional thickness of about 1 inch to about 1.500 inches.

8. The wear resistant drill pipe of claim 1, further comprising at least a pair of tapers providing a transition from an external diameter of the standard weight drill pipe body to an external diameter of the wear pad wherein each taper has an axial length between about 0.5 inches to about 6 inches and an angular slope between about 15 degrees to about 25 degrees.

9. The wear resistant drill pipe of claim 8, wherein each taper has a metallurgical grain structure oriented parallel to the angular slope thereof.

10. The wear resistant drill pipe of claim 1, wherein the wear pad is centrally located between each longitudinal end of the wear resistant drill pipe.

11. The wear resistant drill pipe of claim 1, wherein the wear pad has mechanical properties substantially identical to mechanical properties of the standard weight drill pipe body.

12. The wear resistant drill pipe of claim 1, further comprising a central bore, wherein the central bore has a substantially consistent internal diameter through the wear resistant drill pipe.

13. A wear resistant drill pipe for use in the down-hole environment comprising:
a standard weight drill pipe body having at least one integral wear pad, wherein the wear pad has an external diameter at least about 0.5 inches greater than an external diameter of the standard weight drill pipe body; and
wherein the wear pad comprises a redistributed portion of a substrate material of the standard weight drill pipe body.

14. The wear resistant drill pipe of claim 13, wherein the wear pad has mechanical properties substantially identical to mechanical properties of the standard weight drill pipe body.

15. The wear resistant drill pipe of claim 13, further comprising at least a pair of tapers providing a transition from the external diameter of the standard weight drill pipe body to the external diameter of the wear pad wherein each taper has a metallurgical grain structure parallel with an angular slope thereof.

16. The wear resistant drill pipe of claim 13, wherein the wear pad has a length between about 2 inches to about 24 inches.

17. The wear resistant drill pipe of claim 13, wherein the wear pad has a length between about 10 inches to about 14 inches.

18. A wear resistant drill pipe for use in the down-hole environment comprising:
a standard weight drill pipe body having at least one integral wear pad, wherein the wear pad has an external diameter of at least about 0.5 inches greater than an external diameter of the standard weight drill pipe body, and wherein the wear pad has mechanical properties substantially identical to the mechanical properties of the standard weight drill pipe body; and
wherein the wear pad comprises a redistributed portion of a substrate material of the standard weight drill pipe body.

19. The wear resistant drill pipe of claim 18, wherein a substrate material comprising the standard weight drill pipe body has a grain structure flowing substantially parallel to at least a pair of tapers located between the external diameter of the standard weight drill pipe body and the external diameter of the wear pad.

20. The wear resistant drill pipe of claim 18, wherein the wear pad has a length between about 10 inches to about 14 inches.

21. A method of manufacturing wear resistant drill pipe for use in the down-hole environment comprising:
upsetting an end of a first standard weight drill pipe, the first standard weight drill pipe having an external diameter, thereby providing a first upset comprising a redistributed portion of a substrate material of the first standard weight drill pipe, the first upset having an external diameter greater than the external diameter of the first standard weight drill pipe;
upsetting an end of a second standard weight drill pipe, the second standard weight drill pipe having an external diameter, thereby providing a second upset comprising a redistributed portion of a substrate material of the second standard weight drill pipe, the second upset having an external diameter greater than the external diameter of the second standard weight drill pipe, wherein the external diameter of the second upset is substantially equal to the external diameter of the first upset; and
joining the first upset to the second upset, wherein the first standard weight drill pipe remains substantially concentric to the second standard weight drill pipe, thereby forming an integral wear pad on the resulting wear resistant drill pipe, the wear pad having an external diameter substantially equal to external diameters of the first and second upsets.

22. The method of manufacturing wear resistant drill pipe of claim 21, wherein the step of joining the first and second upsets uses a process selected from the group consisting of an inertia welding process and a friction welding process.

23. The method of manufacturing wear resistant drill pipe of claim 21, wherein the step of upsetting forms upsets having an external diameter at least 0.5 inches greater than the external diameters of each of the first and second standard weight drill pipes.

24. The method of manufacturing wear resistant drill pipe of claim 21, wherein the wear pad has a length between about 2 inches to about 24 inches.

25. The method of manufacturing wear resistant drill pipe of claim 21, wherein the wear pad is centrally located on the wear resistant drill pipe.

26. The method of manufacturing wear resistant drill pipe of claim 21, further comprising the step of:
concentrically joining a third tubular member between the first and second upsets, the joining of the third tubular member between the first and second upsets providing the integral wear pad on the resulting wear resistant drill pipe, the wear pad having an external diameter substantially equal to the external diameters of the first and second upsets.

27. The method of manufacturing wear resistant drill pipe of claim 26, wherein the third tubular member is selected from the group consisting of a section of drill pipe stock, and a tube formed by threadedly connecting a tool joint pin and tool joint box to one another.

28. The method of manufacturing wear resistant drill pipe of claim 26, wherein the third tubular member is concentrically joined to each of the first and second upsets using a process selected from the group consisting of an intertia welding process and a friction welding process.

29. The method of manufacturing wear resistant drill pipe of claim 26, wherein a first end of the third tubular member is concentrically joined to the first upset before a second end of the third tubular member is joined to the second upset.

30. The method of manufacturing wear resistant drill pipe of claim 21, further comprising the step of heat treating the resulting wear resistant drill pipe to a hardness ranging from about 20 HRC to about 38 HRC.

31. A method of manufacturing wear resistant drill pipe for use in the down-hole environment comprising:
- upsetting an end of a first standard weight drill pipe, the first standard weight drill pipe having an external diameter, thereby providing a first upset comprising a redistributed portion of a substrate material of the first standard weight drill pipe, the first upset having an external diameter greater than the external diameter of the first standard weight drill pipe;
- upsetting an end of a second standard weight drill pipe, the second standard weight drill pipe having an external diameter, thereby providing a second upset comprising a redistributed portion of a substrate material of the second standard weight drill pipe, the second upset having an external diameter greater than the external diameter of the second standard weight drill pipe, wherein the external diameter of the second upset is substantially equal to the external diameter of the first upset;
- providing a third tubular member having first and second ends, the third tubular member having an external diameter substantially equal to the external diameters of the first and second upsets;
- joining the first upset to the first end of the third tubular member, wherein the first standard weight drill pipe remains substantially concentric with the third tubular member; and
- joining the second upset to the second end of the third tubular member, wherein the second standard weight drill pipe remains substantially concentric with the third tubular member and the first standard weight drill pipe, the joining of the first and second upsets to the third tubular member thereby defining an integral wear pad having an external diameter substantially equal to the external diameters of the first and second upsets.

32. The method of manufacturing wear resistant drill pipe of claim 31, wherein the third tubular member is concentrically joined to each of the first and second upsets using an inertia welding process.

33. The method of manufacturing wear resistant drill pipe of claim 31, wherein the step of upsetting forms upsets having an external diameter at least 0.5 inches greater than the external diameters of each of the first and second standard weight drill pipes.

34. The method of manufacturing wear resistant drill pipe of claim 31, wherein the wear pad has a length between about 2 inches to about 24 inches.

35. The method of manufacturing wear resistant drill pipe of claim 31, wherein the step of upsetting forms tapers that provide a transition from the external diameters of each of the first and second standard weight drill pipes to the external diameter of the wear pad, wherein each of the tapers having an axial length ranging from about 0.5 inches to about 6 inches and an angular slope ranging from about 15 degrees to about 25 degrees.

36. The method of manufacturing wear resistant drill pipe of claim 31, wherein the wear pad is centrally located on the wear resistant drill pipe.

37. The method of manufacturing wear resistant drill pipe of claim 31, wherein the third tubular member is selected from the group consisting of a section of drill pipe stock, and a tube formed by threadedly connecting a tool joint pin and a tool joint box to one another.

38. The method of manufacturing wear resistant drill pipe of claim 31, wherein a first end of the third tubular member is concentrically joined to the first upset before a second end of the third tubular member is joined to the second upset.

39. The method of manufacturing wear resistant drill pipe of claim 31, further comprising the step of heat treating the resulting war resistant drill pipe to a hardness ranging from about 20 HRC to about 38 HRC.

40. The method of manufacturing wear resistant drill pipe of claim 31, further comprising the steps:
- concentrically abutting together said second upset and said second end of said third tubular member thereby forming a weld groove with a landing, wherein the weld groove is defined by a step, a beveled face, and a radius carried by said third tubular member; and
- applying a weld to the weld groove, thereby joining the second end of the third tubular member with the second upset.

41. The method of manufacturing wear resistant drill pipe of claim 40, further comprising the steps of:
- preheating the third tubular member and second upset to a temperature between about 350 degrees Fahrenheit to about 450 degrees Fahrenheit prior to application of the weld to the weld groove; and
- applying a water mist to the bores of the third tubular member and second upset during applications of the weld.

42. A method manufacturing wear resistant drill pipe for use in the down-hole environment comprising:
- upsetting an end of a first standard weight drill pipe body, the first standard weight drill pipe having external diameter, thereby a first upset comprising a redistributed portion of a substrate material of the first standard weight drill pipe, the first upset having an external diameter greater than the external diameter of the first standard weight drill pipe;
- upsetting an end of a second standard weight drill pipe body, the second standard weight drill pipe having an external diameter, thereby providing a second upset comprising a redistributed portion of a substrate material of the second standard weight drill pipe, the second upset having an external diameter greater than the external diameter of the second standard weight drill pipe;
- concentrically connecting the first upset to a tool joint pin and the second upset to a tool joint box;
- threadedly connecting the tool joint pin to the tool joint box, the connection of the tool joint pin to the tool joint box thereby forming a wear pad; and
- permanently securing the connection of the tool joint pin to the tool joint box.

43. The method of manufacturing wear resistant drill pipe of claim 42, further comprising the steps of:
- forming a weld groove around a circumferential mating surface between the tool joint pin and tool joint box; and
- applying a weld to the weld groove, thereby permanently securing the threaded connection of the tool joint pin to the tool joint box.

44. The method of manufacturing wear resistant drill pipe of claim 43, further comprising the steps of:
- preheating the tool joint pin and box to a temperature between about 30 degrees Fahrenheit to about 450 degrees Fahrenheit prior to application of the weld to the weld groove; and
- applying a water mist to a bore within the tool joint pin and box during application of the weld.

45. The method of manufacturing wear resistant drill pipe of claim 42, wherein the steps of connecting the first upset to the tool joint pin and the second upset to the tool joint box use a process selected from the group consisting of an inertia welding process and a friction welding process.

46. The method of manufacturing wear resistant drill pipe of claim 42, wherein the tool joint pin and the tool joint box each have an external diameter substantially equal to one another and at least 0.5 inches greater than external diameters of each of the first drill pipe body and the second drill pipe body.

47. The method of manufacturing wear resistant drill pipe of claim 42, wherein the wear pad is centrally located on the sear resistant drill pipe.

48. The method of manufacturing wear resistant drill pipe of claim 42, further comprising the step of stress-relieving the resulting wear resistant drill pipe.

49. The method of manufacturing wear resistant drill pipe of claim 42, further comprising the step of heat treating the first standard weight drill pipe body carrying the first upset, the second standard weight drill pipe body carrying the second upset, the tool joint pin and the tool joint box to a hardness between about 20 HRC to about 38 HRC.

50. The method of manufacturing wear resistant drill pipe of claim 49, wherein the heat treating step occurs prior to the step of connecting the first upset to the tool joint pin and the second upset to the tool joint box.

51. A method of manufacturing wear resistant drill pipe for use in the down-hole environment comprising:
  upsetting an end of a first standard weight drill pipe having a first external diameter, thereby providing a first upset having a second external diameter, the second external diameter comprising a redistributed portion of a substrate material of the first standard weight drill pipe, the first upset;
  upsetting an end of second standard weight drill pipe having a first external diameter, thereby providing a second upset having a second external diameter, the second external diameter comprising a redistributed portion of a substrate material of the first standard weight drill pipe, the first upset, wherein the second external diameter of the second upset is substantially the same as the second external diameter of the first upset;
  providing a third tubular member comprising a wear pad having a third external diameter, a first end having a fourth external diameter, and a second end having a fourth external diameter, wherein the fourth external diameters of the first and second ends of the third tubular member are substantially equal to one another and substantially equal to the second external diameters of the first and second upsets, and wherein the third external diameter of the wear pad is greater than the first external diameters of the first and second standard weight drill pipes and the second external diameters of the first and second upsets, and wherein the wear pad is located between the first and second ends of the third tubular member;
  joining the first upset to the first end of the third tubular member, wherein the first standard weight drill pipe remains substantially concentric with the third tubular member; and
  joining the second upset to the second end of the third tubular member, wherein the second standard weight drill pipe remains substantially concentric with the third tubular member and the first standard weight drill pipe.

52. The method of manufacturing wear resistant drill pipe of claim 51, wherein the third tubular member is concentrically joined to each of the first and second upsets using an inertia welding process.

53. The method of manufacturing wear resistant drill pipe of claim 51, wherein the third external diameter of the wear pad is at least 0.5 inches greater than the first external diameters of each of the first and second standard weight drill pipes.

54. The method of manufacturing wear resistant drill pipe of claim 51, wherein the wear pad has a length between about 2 inches to about 24 inches.

55. The method of manufacturing wear resistant drill pipe of claim 51, wherein the wear pad has at least a pair of tapers that provide a transition from the second external diameters of each of the first and second upsets to the third external diameter of the wear pad, wherein each of the tapers have an axial length ranging from about 0.5 inches to about 6 inches and an angular slope ranging from about 15 degrees to about 25 degrees.

56. The method of manufacturing wear resistant drill pipe of claim 51, wherein the wear pad is centrally located on the wear resistant drill pipe.

57. The method of manufacturing wear resistant drill pipe of claim 51, wherein a first end of the third tubular member is concentrically joined to the first upset before a second end of the third tubular member is joined to the second upset.

58. The method of manufacturing wear resistant drill pipe of claim 51, further comprising the step of heat treating the resulting wear resistant drill pipe to a hardness ranging from about 20 HRC to about 38 HRC.

59. The method of manufacturing wear resistant drill pipe to claim 51, further comprising the steps of:
  concentrically abutting together said second upset and said second end of said third tubular member thereby forming a weld groove with a landing, wherein the weld groove is defined by a step, a beveled face, and a radius carried by said second upset and a step, a beveled face, and a radius carried by said third tubular member; and
  applying a weld to the weld groove, thereby joining the second end of the third tubular member with the second upset.

60. The method of manufacturing wear resistant drill pipe of claim 59, further comprising the steps of:
  preheating the third tubular member and second upset to a temperature between 350 degrees Fahrenheit to about 450 degrees Fahrenheit prior to application of the weld to the weld groove; and
  applying a water mist to the bores of the third tubular member and second upset during application of the weld.

61. A wear resistant drill pipe for use in the down-hole environment comprising:
  a standard weight drill pipe body having at least one integral wear pad, wherein the wear pad has an external diameter at least about 0.5 inches greater than an external diameter of the standard weight drill pipe body; and
  at least a pair of tapers providing a transition from the external diameter of the standard weight drill pipe body to the external diameter of the wear pad wherein each taper has a metallurgical grain structure parallel with an angular slope thereof.

62. The wear resistant drill pipe of claim 61, further comprising a hard-banding layer on the wear pad.

63. The wear resistant drill pipe of claim 61, wherein the wear pad has a length between about 2 inches to about 24 inches.

64. The wear resistant drill pipe of claim 61, wherein the wear pad has a length between about 10 inches to about 14 inches.

65. The wear resistant drill pipe of claim 61, wherein the wear pad has an external diameter between about 4 inches to about 8 inches.

66. The wear resistant drill pipe of claim 61, wherein the wear pad has a cross-sectional thickness of about 1 inch to about 1.500 inches.

67. The wear resistant drill pipe of claim 61, further comprising at least a pair of tapers providing a transition from an external diameter of the standard weight drill pipe body to an external diameter of the wear pad wherein each taper has an axial length between about 0.5 inches to about 6 inches and an angular slope between about 15 degrees to about 25 degrees.

68. The wear resistant drill pipe of claim 61, wherein each taper has a metallurgical grain structure oriented parallel to the angular slope thereof.

69. The wear resistant drill pipe of claim 61, wherein the wear pad is centrally located between each longitudinal end of the wear resistant drill pipe.

70. The wear resistant drill pipe of claim 61, wherein the wear pad has mechanical properties substantially identical to mechanical properties of the standard weight drill pipe body.

71. The wear resistant drill pipe of claim 61, further comprising a central bore, wherein the central bore has a substantially consistent internal diameter through the wear resistant drill pipe.

72. A wear resistant drill pipe for use in the down-hole environment comprising:
   a standard weight drill pipe body having at least one integral wear pad, wherein the wear pad has an external diameter at least about 0.5 inches greater than an external diameter of the standard weight drill pipe body, and wherein the wear pad has mechanical properties substantially identical to the mechanical properties of the standard weight drill pipe body; and
   at least a pair of tapers providing a transition from the external diameter of the standard weight drill pipe body to the external diameter of the wear pad wherein each taper has a metallurgical grain structure parallel with an angular slope thereof.

73. The wear resistant drill pipe of claim 72, further comprising a hard-banding layer on the wear pad.

74. The wear resistant drill pipe of claim 72, wherein the wear pad has a length between about 2 inches to about 24 inches.

75. The wear resistant drill pipe of claim 72, wherein the wear pad has a length between about 10 inches to about 14 inches.

76. The wear resistant drill pipe of claim 72, wherein the wear pad has an external diameter between about 4 inches to about 8 inches.

77. The wear resistant drill pipe of claim 72, wherein the wear pad has a cross-sectional thickness of about 1 inch to about 1.500 inches.

78. The wear resistant drill pipe of claim 72, wherein the wear pad comprises a redistributed portion of a substrate material of the standard weight drill pipe body.

79. The wear resistant drill pipe of claim 72, wherein each taper has an axial length between about 0.5 inches to about 6 inches and an angular slope between about 15 degrees to about 25 degrees.

80. The wear resistant drill pipe of claim 72, wherein the wear pad is centrally located between each longitudinal end of the wear resistant drill pipe.

81. The wear resistant drill pipe of claim 72, further comprising a central bore, wherein the central bore has a substantially consistent internal diameter through the wear resistant drill pipe.

* * * * *

UNITED STATES PATENT AND TRADEMARK OFFICE
CERTIFICATE OF CORRECTION

PATENT NO. : 8,783,344 B2  
APPLICATION NO. : 13/984569  
DATED : July 22, 2014  
INVENTOR(S) : Thein Htun Aung et al.

Page 1 of 1

It is certified that error appears in the above-identified patent and that said Letters Patent is hereby corrected as shown below:

In the Specification

Column 14, line 29, after "thereby" insert --providing--.

Signed and Sealed this
Fourteenth Day of October, 2014

Michelle K. Lee
*Deputy Director of the United States Patent and Trademark Office*